United States Patent [19]
Manabe

[11] Patent Number: 5,423,067
[45] Date of Patent: Jun. 6, 1995

[54] DIGITAL MOBILE COMMUNICATIONS SYSTEM AND METHOD FOR PROVIDING INTENSITY/COVERAGE REFERENCE MAPS USING BASE STATIONS AND MOBILE STATIONS

[75] Inventor: Shinichi Manabe, Tokyo, Japan

[73] Assignee: NEC Corporation, Tokyo, Japan

[21] Appl. No.: 940,994

[22] Filed: Sep. 4, 1992

[30] Foreign Application Priority Data

Sep. 9, 1991 [JP] Japan .................. 3-227611

[51] Int. Cl.⁶ .................. H04B 7/26; H04B 17/00
[52] U.S. Cl. .................. 455/56.1; 455/51.1; 455/67.1; 455/67.7
[58] Field of Search .................. 455/33.1, 33.2, 33.4, 455/56.1, 51.1, 67.1, 67.7; 342/450, 457, 463, 464

[56] References Cited

U.S. PATENT DOCUMENTS 4,651,157 3/1987 Gray et al. .................. 342/457
5,128,925 7/1992 Dornstetter et al. .................. 370/47

FOREIGN PATENT DOCUMENTS

0123562A1 10/1984 European Pat. Off. .
0320913A2 6/1989 European Pat. Off. .
0341738A2 11/1989 European Pat. Off. .
0398773A1 11/1990 European Pat. Off. .
2013062 8/1979 United Kingdom .
2222922A 3/1990 United Kingdom .

*Primary Examiner*—Reinhard J. Eisenzopf
*Assistant Examiner*—Chi H. Pham
*Attorney, Agent, or Firm*—Foley & Lardner

[57] ABSTRACT

A digital mobile communications system which maintains synchronization among sending data of base stations, measures the time delay of radio waves from mobile stations under control at the control base station and instructs the value of time delay to each mobile station to adjust the timing of sending data of mobile stations to establish synchronization of communications between the base station and the mobile stations, wherein the system comprises means for measuring at mobile stations relative time delays of radio waves from at least one base station other than the control base station with respect to the radio waves from the control base station and periodically reporting the relative time delays to the control base station, and means for calculating at the base station the distances between the mobile station and the base stations and further determining the current geographic positions of the mobile station.

8 Claims, 11 Drawing Sheets

DIGITAL MOBILE COMMUNICATIONS SYSTEM AND METHOD FOR PROVIDING INTENSITY/COVERAGE REFERENCE MAPS USING BASE STATIONS AND MOBILE STATIONS

FIELD OF THE INVENTION

The present invention relates generally to a mobile communications system together with an associated control method thereof and, in particular, to a digital mobile communications system and the associated control method thereof.

DESCRIPTION OF THE PRIOR ART

In conventional digital mobile communications systems of the kind discussed herein, each base station measures the time delay of the radio waves transmitted from mobile stations under its control and instructs the value of the time delay to each mobile station. The timing of the radio wave transmission is then adjusted at each mobile station by advancing the timing as instructed, so as to nullify the time lag between the timings of transmitting and receiving channels at the base station and to establish synchronization of communications between the control base station and the mobile station. Control base station refers to the base station which controls the mobile stations under its control.

In another practical example, a mobile station measures the electric field intensity of the radio waves transmitted from some of the accessible base stations including the control base station and reports the results to the control base station in order to select the preferable control base station.

SUMMARY OF THE INVENTION

The object of the present invention is to provide a digital mobile communications system having the ability to calculate the distances between a mobile station and some base stations including the control base station, and further to determine the current geographic position of the mobile station based on the distance data by referring to geographic positional data on the base stations. It is a further object of the invention to provide a method of making a field intensity distribution map of the radio waves transmitted from base stations. It is still another object of the invention to provide a method of making a map showing the coverage area of each of the base stations.

A further object of the invention is to provide each mobile station with the information of such distances and current geographic positions.

To achieve the objects described above, there is provided a method of controlling a digital mobile communications system which maintains synchronization among data of the base stations being sent, measures the time delay of radio waves transmitted from mobile stations under control at the control base station, and instructs the value of the time delay to each of the mobile stations to adjust the timing of data of the mobile stations being sent to establish synchronization of communications between the base station and the mobile stations, wherein the method comprising the steps of measuring at the mobile station relative time delays of radio waves transmitted from at least one base station other than the control base station with respect to the radio waves transmitted from the control base station, periodically reporting the information on the relative time delays to the control base station from the mobile station, and periodically calculating at the control base station the distances between the mobile station and each of the base stations based on the information on the time delay and relative time delays.

The method of controlling a digital mobile communications system can further comprise the following steps:

periodically determining at the control base station the current geographic position of the mobile station based on the calculated distances between the mobile station and each of at least three of the base stations by referring to the geographic positional data on the base stations, periodically measuring at the mobile station the electric field intensity of the radio waves transmitted from each of the base stations including the control base station during the same period as measuring the relative time delays, reporting from the mobile station to the control base station information on the field intensity together with information on the relative time delays, and depicting an electric field intensity distribution map for radio waves by plotting the electric field intensity of the same radio waves reported from a plurality of the mobile stations at the current geographic positions of the mobile stations, depicting a map showing the coverage area of each of the base stations by plotting the current geographic positions of the mobile stations under control by assigning different designations corresponding to each base station, providing information on the distances for the mobile station from the control base station and indicating the distances at the mobile station, and providing information on the current geographic position of said mobile station for the mobile station per se from the control base station and indicating the current geographic position at the mobile station.

According to another aspect of this invention there is provided a digital mobile communications system which maintains synchronization among data of base stations being sent, measures the time delay of radio waves transmitted from mobile stations under control at the control base station, and instructs the value of the time delay to each mobile station to adjust the timing of data of the mobile stations being sent to establish synchronization of communications between the base station and the mobile stations, wherein the system comprising means for measuring at the mobile station the relative time delays of radio waves transmitted from at least one base station other than the control base station with respect to the radio waves transmitted from the control base station, means for periodically reporting the information on the relative time delays to the control base station from the mobile station, and means for periodically calculating at the control base station the distances between the mobile station and each of the base stations based on information on the time delay and relative time delays.

The digital mobile communications system described above can further comprise:

means for periodically determining at the control base station the current geographic position of the mobile station based on the calculated distances between the mobile station and each of at least three of the base stations by referring to the geographic positional data on the base stations, means for periodically measuring at the mobile station the electric field intensity of radio waves transmitted from each of the base stations including the control base station during the same period as measuring the relative time delays, reporting from the mobile station to the control base station information on said electric field intensity together with information on the relative time delays, and depicting an electric field intensity distribution map for radio waves by plotting the electric field intensity of the radio waves reported from a plurality of the mobile stations, means for depicting a map showing the coverage area of each of said base stations by plotting the current geographic positions of the mobile stations under control by assigning different designations corresponding to each base station, means for providing information on the distances for the mobile station from the control base station and indicating the distances at the mobile station, and means for providing information on the current geographic position of the mobile station for the mobile station per se from the control base station and indicating the current geographic position at the mobile station.

Other and further objects, features and advantages of the invention will appear more fully from the following description.

DESCRIPTION OF THE PREFERRED EMBODIMENTS

Figure 1:
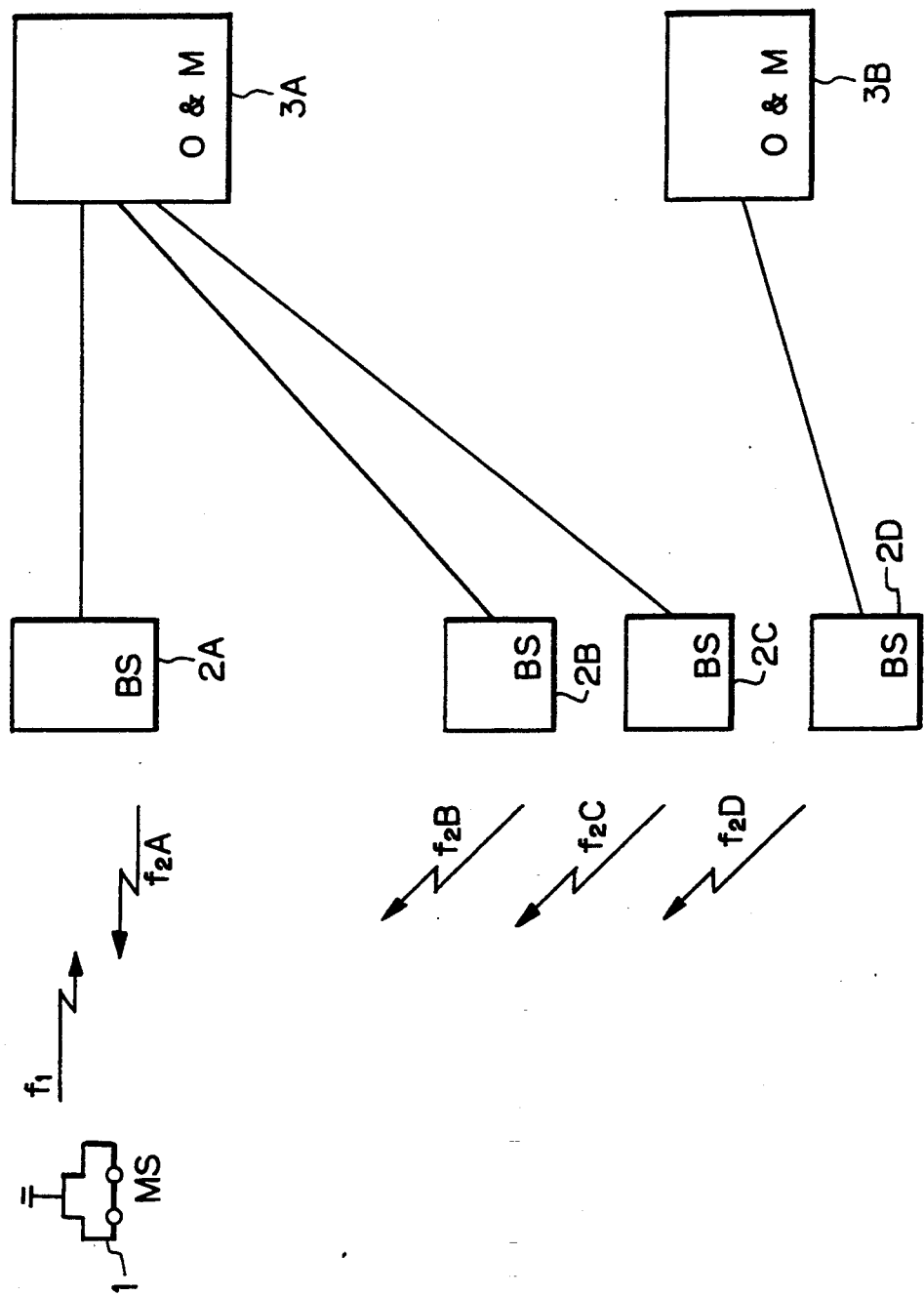
FIG. 1 is a block diagram showing the construction of an embodiment of the digital mobile communications system for automobiles according to the present invention.
Figure 2:
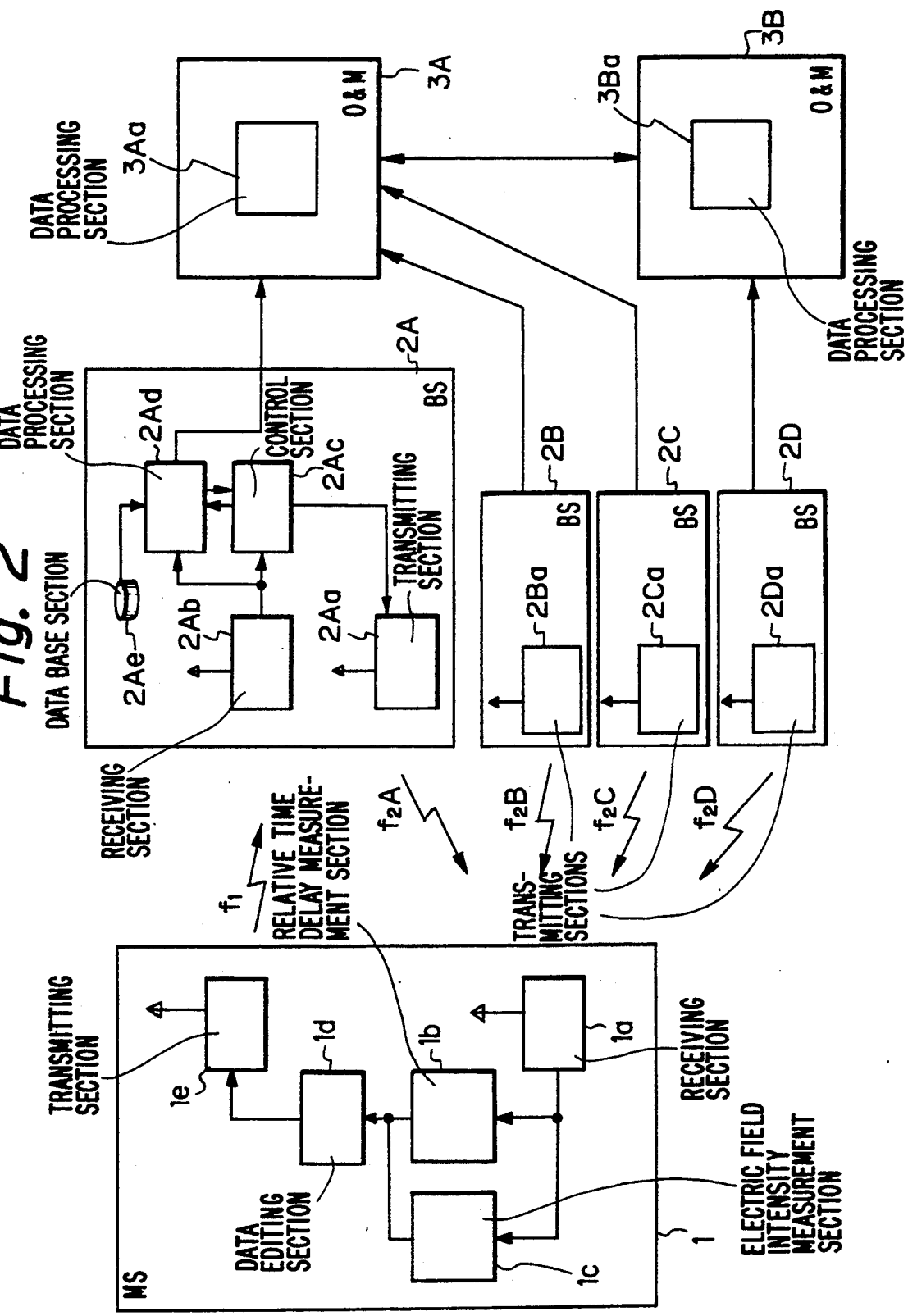
FIG. 2 is a functional block diagram of the digital mobile communications system shown in FIG. 1.
Figure 3:
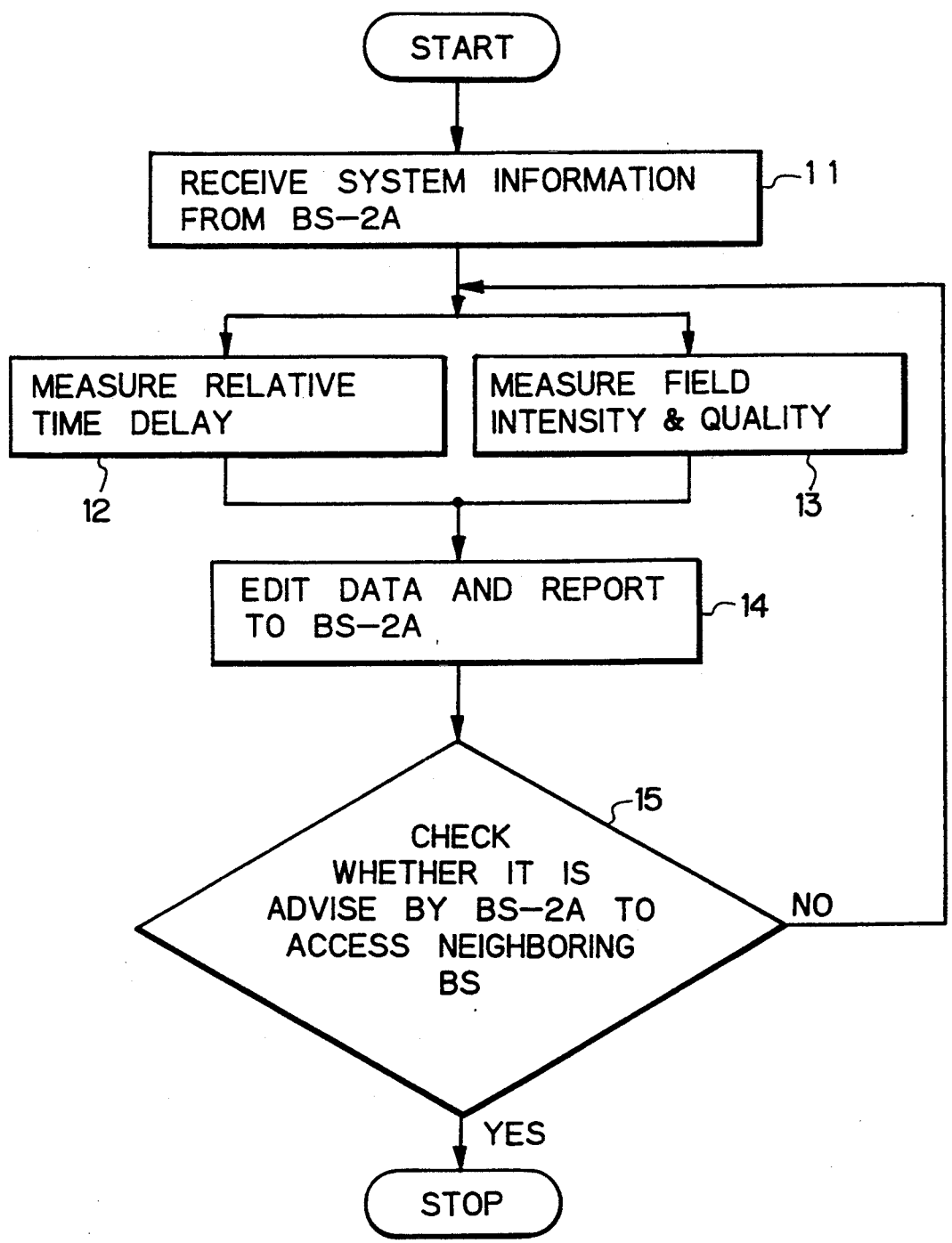
FIG. 3 is a flow chart showing the process to be performed in mobile station 1 of the digital mobile communications system shown in FIG. 1.

With reference to the attached figures, explanation of a digital mobile communications system for automobiles as a preferred embodiment of the present invention will be given as follows:

FIG. 1 shows a digital mobile communications system comprising a mobile station, a plurality of base stations and operation and maintenance centers where the number of stations referred to are minimized to be sufficient to explain the embodiment of the present invention.

Mobile station (MS) 1 is a mobile station operating under the control of base station (BS) 2A, which will hereafter be referred to as control base station 2A. Base stations 2B, 2C and 2D are neighboring base stations to control base station 2A. Base stations 2A, 2B, 2C and 2D broadcast system information for the mobile stations under control through broadcast control channels $f_{2A}$, $f_{2B}$, $f_{2C}$ and $f_{2D}$, respectively. Mobile station 1 reports required information through control channel $f_l$ prescribed by control base station 2A. Operation and maintenance center (0 & M) 3A processes data reported from base stations 2A, 2B and 2C. Operation and maintenance center 3B processes data reported from base station 2D.

The construction and control method of the present embodiment are explained below using FIGS. 2-5 as follows:

Mobile station (MS) 1 consists of receiving section 1a, relative time delay measurement section 1b, electric field intensity measurement section 1c, data editing section 1d and transmitting section 1e. Base station (BS) 2A consists of transmitting section $2A_a$, receiving section $2A_b$, control section $2A_c$, data processing section $2A_d$ and data base section $2A_e$. Each of neighboring base stations 2B, 2C and 2D has the same construction as base station A. Operation and maintenance centers (0 & M) 3A, 3B have maintenance data processing section $3A_a$, $3B_a$. From transmitting sections $2A_a$, $2B_a$, $2C_a$ and $2D_a$, base stations 2A, 2B, 2C and 2D broadcast system information through broadcast control channels $f_{2A}$, $f_{2B}$, $f_{2C}$ and $f_{2D}$, respectively.

Mobile station 1 receives the system information in broadcast control channel $f_{2A}$ from control base station 2A through receiving section 1a (step 11). In the system information, each of the channel numbers of broadcast control channels $f_{2B}$, $f_{2C}$, $f_{2D}$ of neighboring base stations 2B, 2C, 2D, whose electric field intensity and quality together with the relative time delay with respect to broadcast control channel $f_{2A}$ of control base station 2A are to be measured at mobile station 1, are indicated.

Relative time delay measurement section 1b of mobile station 1 measures each relative time delay of the reception timing of the prescribed broadcast control channels $f_{2B}$, $f_{2C}$, $f_{2D}$ of neighboring base stations 2B, 2C, 2D, with respect to the reception timing of broadcast control channel $f_{2A}$ of control base station 2A (step 12). This is a newly added function to a digital mobile communications system according to the present invention, and relative time delay measurement section 1b is introduced to realize this function in mobile station 1.

Figure 5:
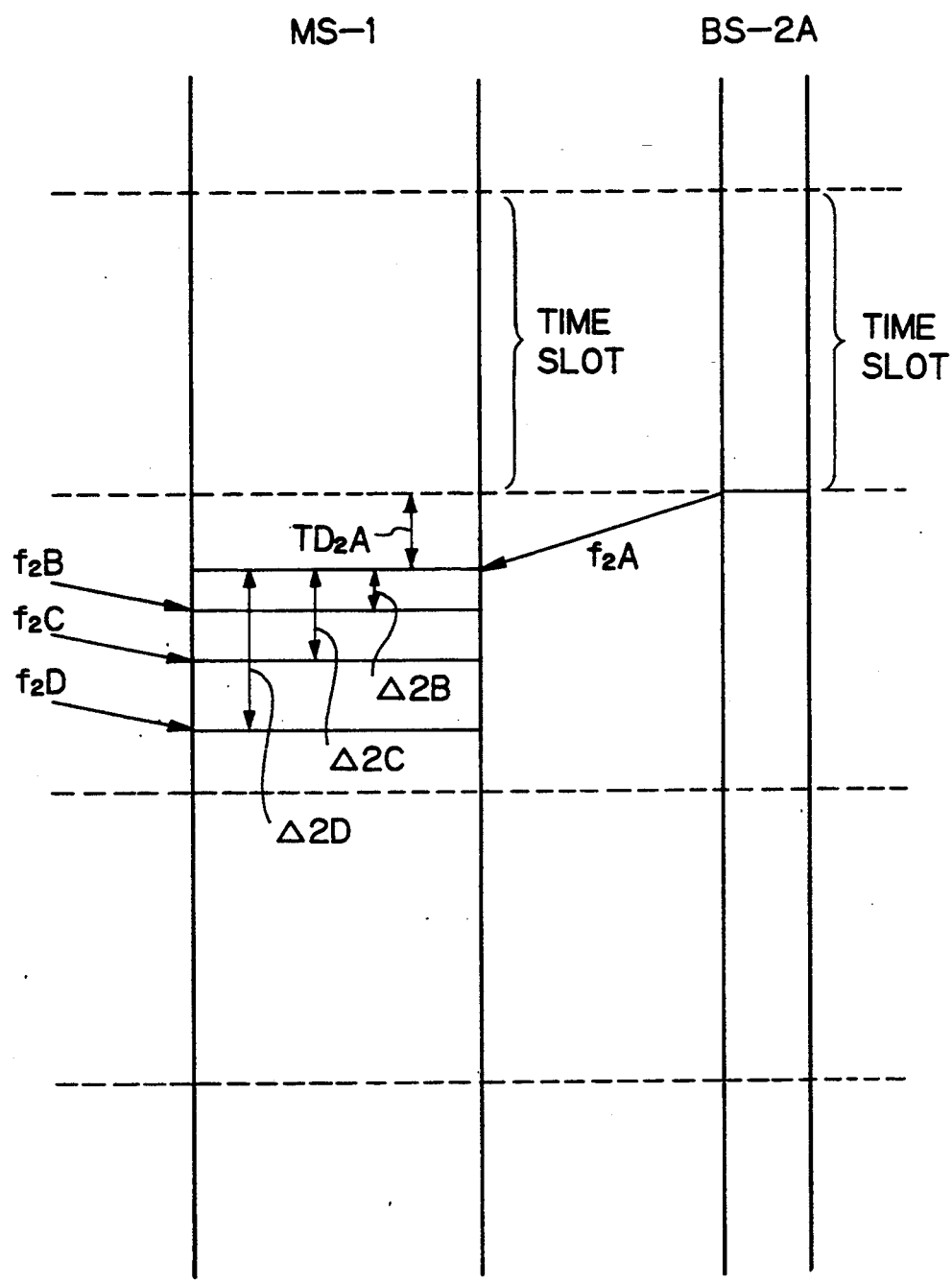
FIG. 5 shows the relationship between the time delay and the relative time delays.

FIG. 5 shows time delay TD2A of the time slot in the sending data transmitted by control base station 2A when received at mobile station 1, and relative time delays Δ2B, Δ2C, Δ2D of the reception timing of broadcast control channels $f_{2B}$, $f_{2C}$, $f_{2D}$ with respect to the reception timing of broadcast control channel $f_{2A}$ from control base station 2A which are measured at mobile station 1. Time delay TD2A naturally has the same value as time delay measured at control base station 2A and instructed to mobile station 1 as described in the "Description of the Prior Art". The new feature of the present invention is that relative time delays Δ2B, Δ2C, Δ2D are measured at mobile station 1 and reported from mobile station 1 to control base station 2A. Since the synchronization of the sending data are maintained among the base stations, the algebraic sum of time delay $TD_{2A}$ and the values of relative time delays (or advances) Δ2B, Δ2C, Δ2D of broadcast control channels $f_{2B}$, $f_{2C}$, $f_{2D}$ of neighboring base stations 2B, 2C, 2D designates the period of time required for the propagation of the radio waves transmitted from base stations 2B, 2C, 2D, respectively, to mobile station 1.

By measuring relative time delays Δ2B, Δ2C, Δ2D at mobile station 1 and reporting the results of the measurement to control base station 2A, full information on $TD_{2A}$ as well as Δ2B, Δ2C, Δ2D are available at control base station 2A and the distances between mobile station 1 and each of base stations 2A, 2B, 2C, 2D can be calculated easily at control base station 2A.

Electric field intensity measurement section 1c of mobile station 1 measures the electric field intensity and electric field quality of each of broadcast control channels $f_{2A}$, $f_{2B}$, $f_{2C}$, $f_{2D}$ (step 13).

At data editing section 1d, the measured data of relative time delays Δ2B, Δ2C, Δ2D and the data on the electric field intensity and quality are combined together to edit "data for control base station". This "data for control base station" is periodically reported to control base station 2A from transmitting section 1e through control channel $f_l$ (step 14).

Unless mobile station 1 is advised to access any of the neighboring base stations by control station 2A, steps 12 through 14 are repeated (step 15).

Figure 4:
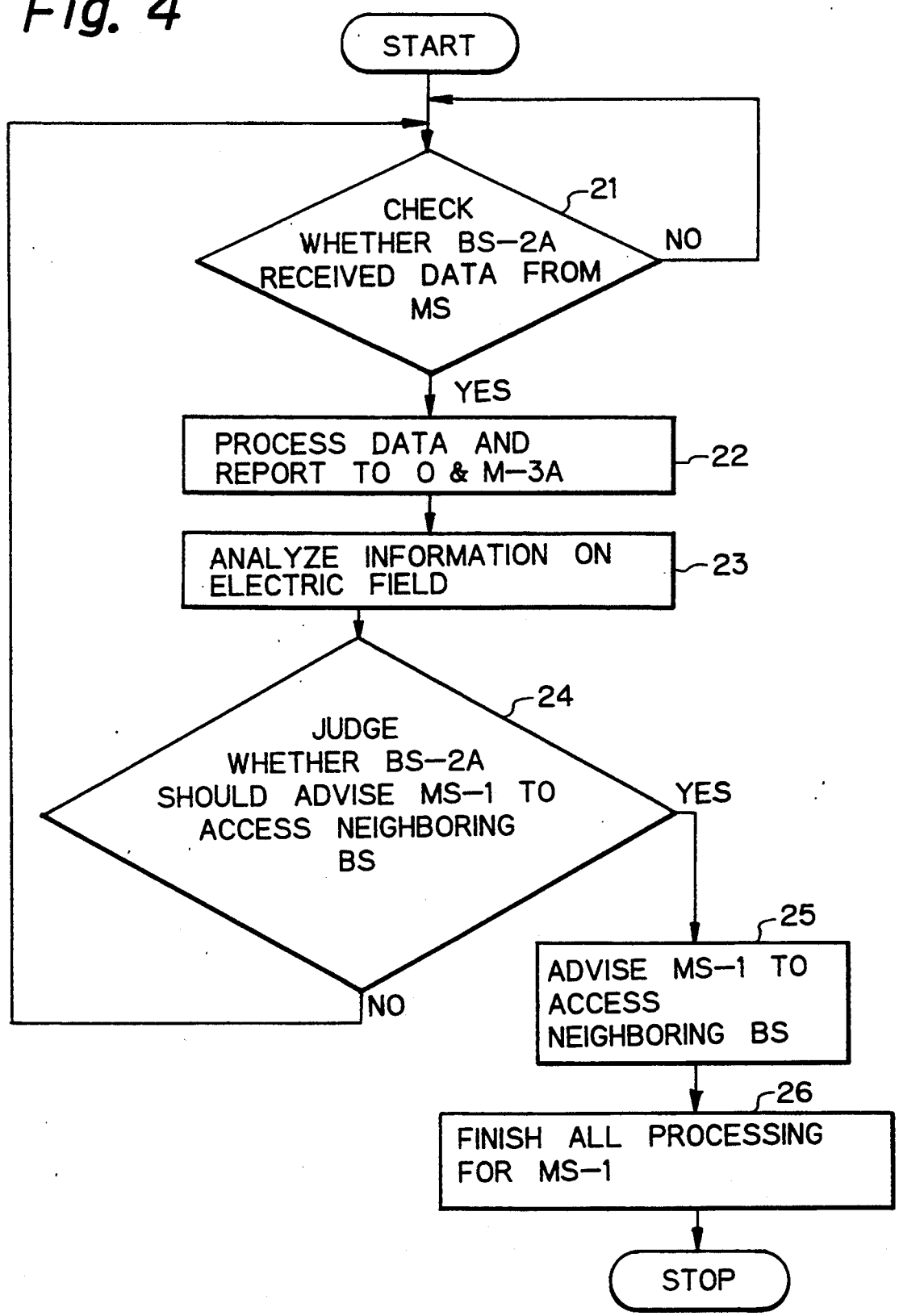
FIG. 4 is a flow chart showing the process to be performed in control base station 2A of the digital mobile communications system shown in FIG. 1.

With reference to FIG. 4, control base station 2A monitors the reception of "data for control base station" reported from the mobile stations under its control (step 21).

When "data for control base station" sent from mobile station 1 to control base station 2A is received by receiving section $2A_b$, it is transferred to data processing section $2A_d$. Separately, time delay $TD_{2A}$ of mobile station 1 measured at control base station 2A is sent to data processing section $2A_d$ from control section $2A_c$. The distances between mobile station 1 and each of base stations 2A, 2B, 2C, 2D are calculated based on the propagation time as referred to above.

Further, by referring to the geographic positional data of at least three base stations in data base section $2A_e$, the current geographic position of mobile station 1 is determined based on these distances.

Figure 6:
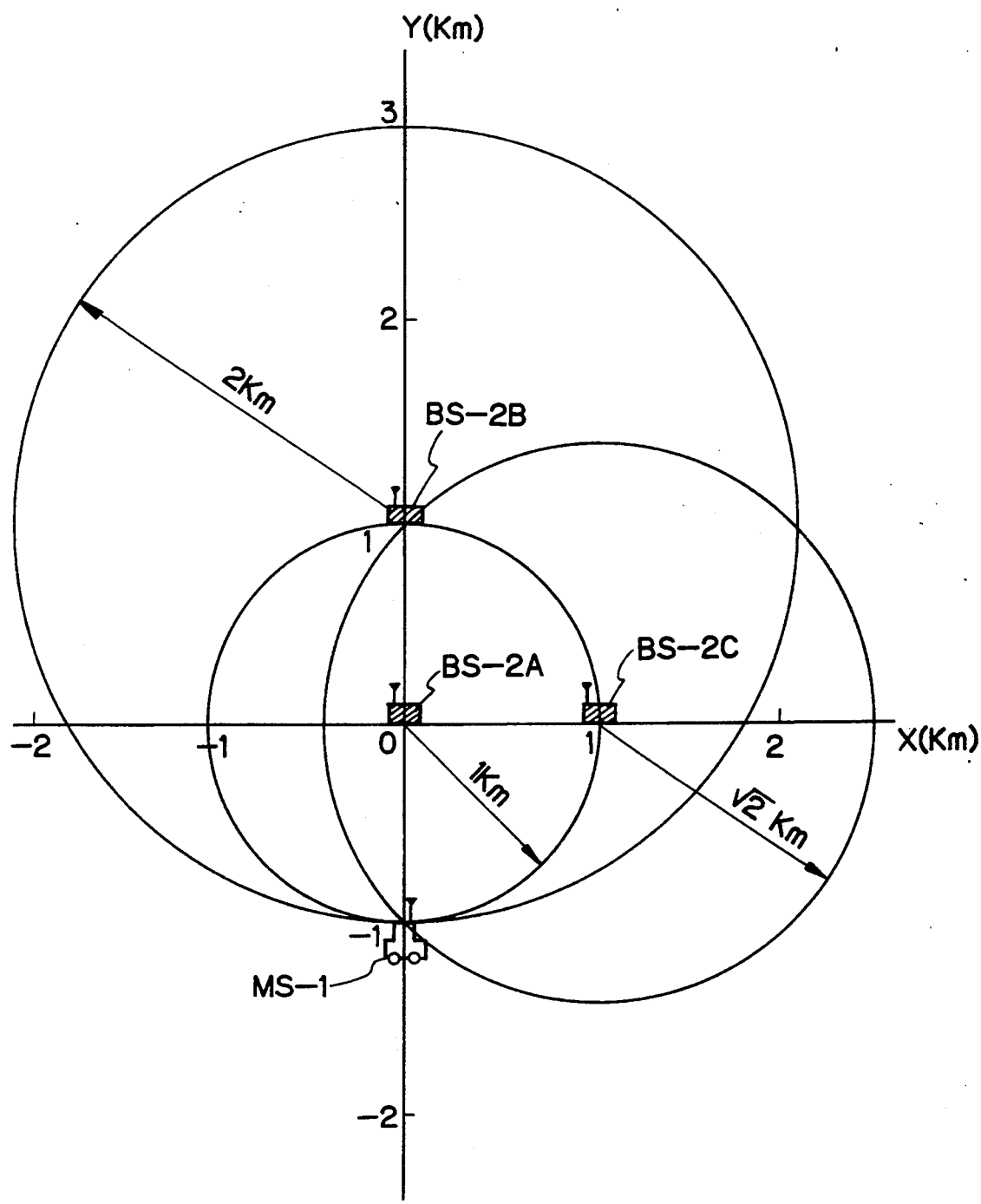
FIG. 6 is a map showing the determination of the current geographic position of mobile station 1.

With reference to FIG. 6, explanations are given on the determination of the current geographic position of mobile station 1.

It is assumed that there is an X-Y plane with the control base station at the origin and, for the sake of simplicity, it is assumed that the coordinates of the positions of base stations 2A, 2B and 2C are stored in data base section 2Ae as (0, 0), (0, 1) and (1, 0), respectively, and that the unit for both abscissa and ordinate is 1 km. It is also assumed that the distance between control base station 2A and mobile station 1 is 1 km, that the distance between neighboring base station 2B and mobile station 1 is 2 km and that the distance between neighboring base station 2C and mobile station 1 is 2½km respectively, as the result of analysis of the data sent from mobile station 1 to control base station 2A. The position of mobile station 1 is then determined as (0, 1), which is referred to "current geographic position".

The information including "current geographic position" and electric field intensity at the same position is then reported from data processing section 2Ad to operation and maintenance center 3A as "maintenance data" (step 22). The information of "current geographic position" can be provided for mobile station 1 through transmitting section $2A_a$.

The data on electric field intensity and quality are analyzed by control section $2A_c$ (step 23), so that it can judge whether an instruction to access any of the neighboring base stations is required for mobile station 1 (step 24).

When access to a neighboring base station is judged to be required, access to the neighboring base station is instructed to mobile station 1 through transmitting section $2A_a$ (step 25). Then all of the process required for mobile station 1 is completed at base station 2A (step 26).

When access to a neighboring base station is judged to be unnecessary, the process of control base station 2a is continued to repeat the monitoring of "data for control base station" sent to base station 2A from any of the mobile stations under its control.

At operation and maintenance center 3A, "maintenance data" from base stations 2A, 2B and 2C are stored as samples and processed at maintenance data processing section $3A_a$. An example of processing "maintenance data" is the depiction of the electric field intensity distribution map around base station 2A. For the sake of simplicity, it is assumed with reference to FIG. 7, that mobile stations 1A, 1B, 1C and 1D report to control base station 2A with the results of measurements of electric field intensity at time $t_o$ simultaneously, and repeat the report at period t until the end of the measurements at time $t_o+3t$.

In Table 1, data on the electric field intensity of broadcast control channel $f_{2A}$ of control base station 2A received by each of mobile stations 1A, 1B, 1C, 1D at different "current geographic positions" at different times are tabulated.

TABLE 1

| time | to | to + t | to + 2t | to + 3t |
|---|---|---|---|---|
| | MS-1A | | | |
| electric field intensity (dBm) | −59 | −59 | −62 | −59 |
| current geographic position | (1.20, 0.45) | (1.00, 1.00) | (0.60, 1.45) | (0.25, 0.85) |
| | MS-1B | | | |
| electric field intensity (dBm) | −49 | −54 | −56 | −61 |
| current geographic position | (0.10, −0.15) | (0.35, −0.15) | (0.60, −0.15) | (1.25, −0.15) |
| | MS-1C | | | |
| electric field intensity (dBm) | −59 | −53 | −56 | −61 |
| current geographic position | (0.65, −0.70) | (−0.10, −0.35) | (−0.60, 0) | (−0.70, 0.55) |
| | MS-1D | | | |
| electric field intensity (dBm) | −61 | −52 | −59 | −63 |
| current geographic | (−0.60, −1.10) | (−0.35, −0.05) | (−0.10, 0.70) | (0.20, 1.50) |

TABLE 1-continued

| time | to | to + t | to + 2t | to + 3t |
|---|---|---|---|---|
| position | | | | |

Figure 8:
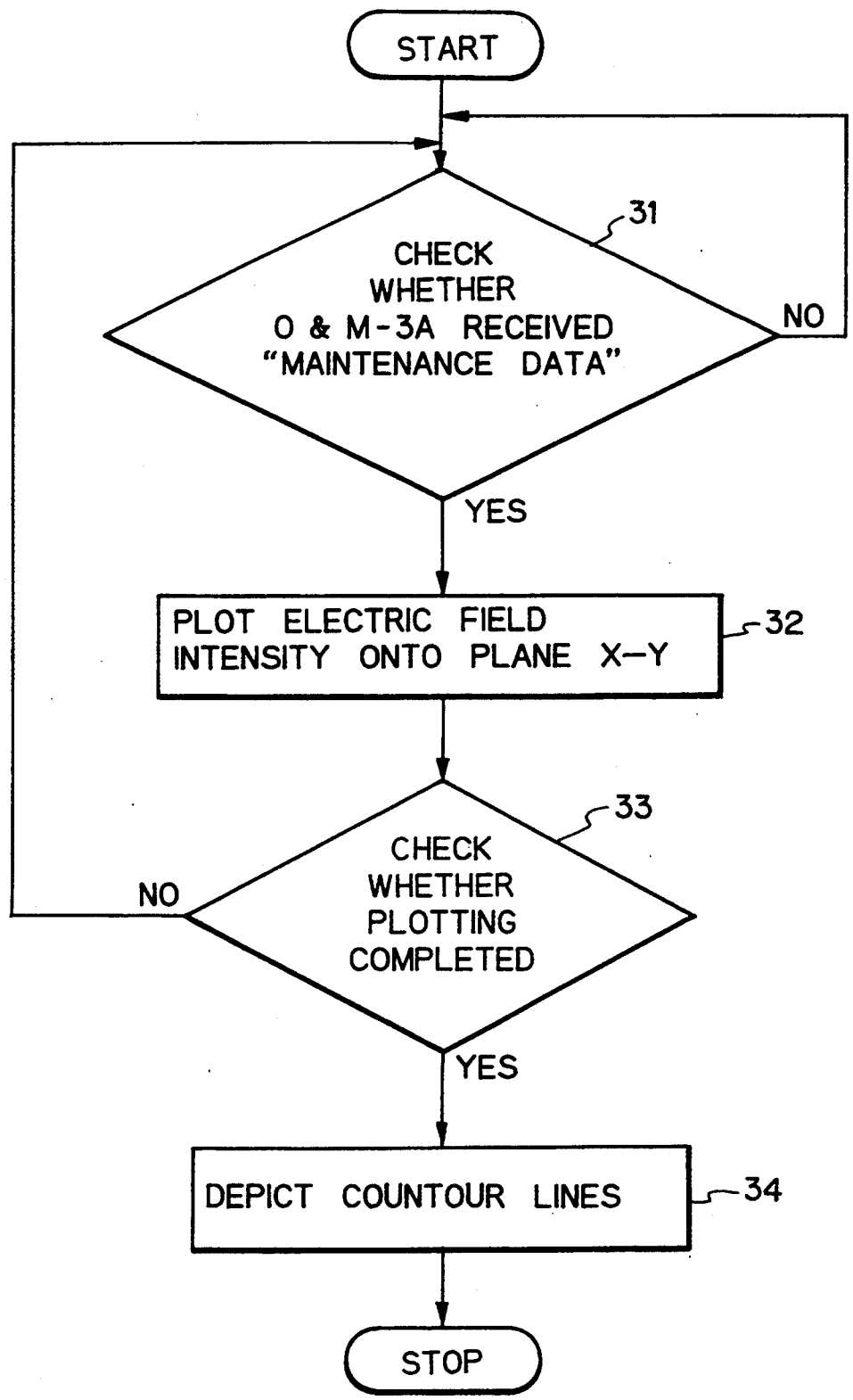
FIG. 8 is a flow chart of the process of depicting an electric field intensity distribution map.

FIG. 8 is a flow chart showing the process of depicting an electric field intensity distribution map. Operation and maintenance center 3A monitors the reception of "maintenance data" from base stations 2A, 2B, 2C (step 31).

Figure 7:
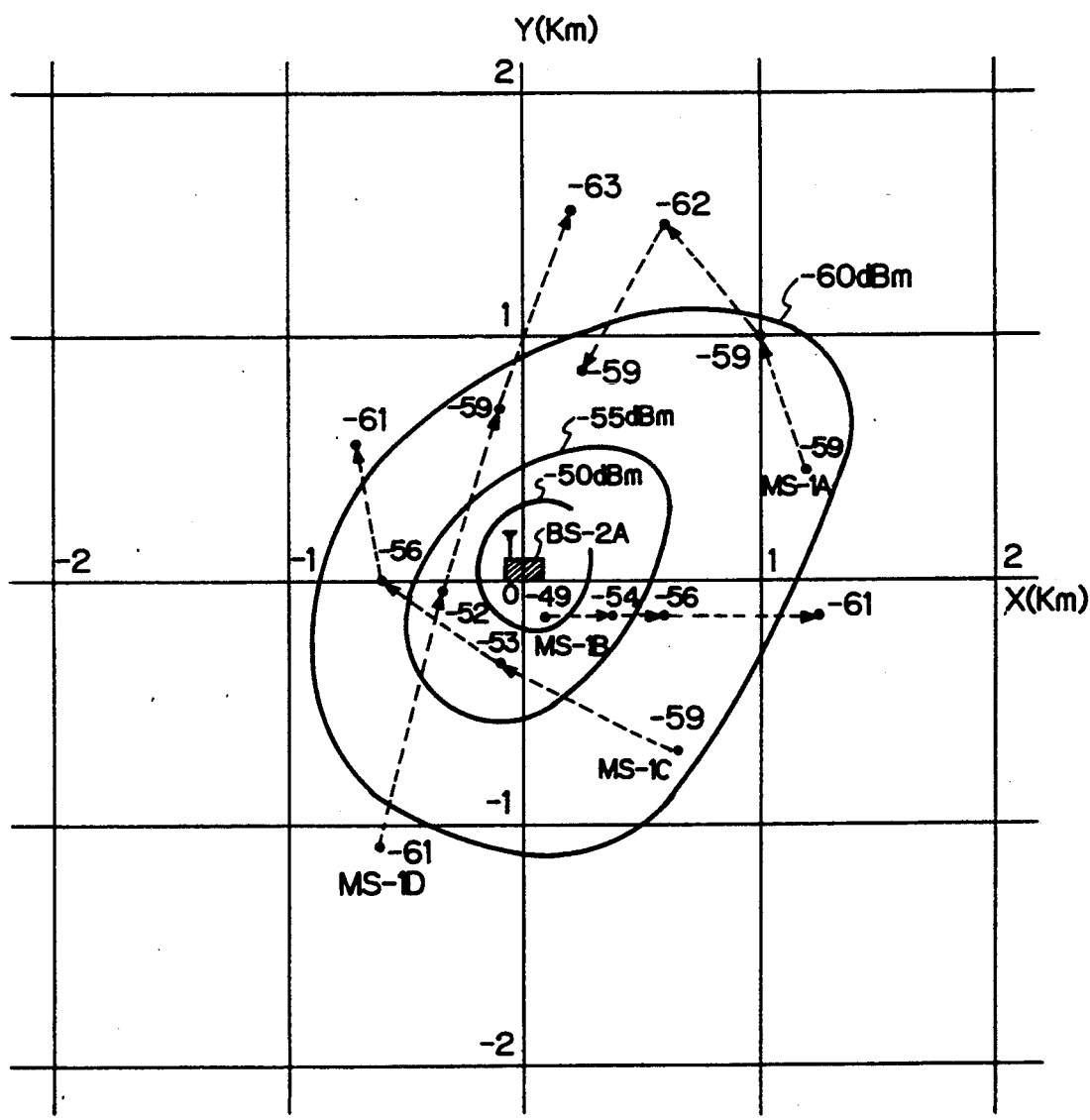
FIG. 7 is an electric field intensity distribution map of broadcast control channel $f_{2A}$ transmitted from base station 2A.

Upon being received, "maintenance data" are analyzed at maintenance data processing section $3A_a$ and the electric field intensity measured at different "current geographic positions" are plotted on plane X-Y as shown in FIG. 7 (step 32).

The series of the plotting is completed after plotting 16 data which were derived in the time duration between $t_o$ and $t_o+3t$ (step 33).

The electric field intensity distribution map is completed by depicting contour lines of the electric field intensity on plane X-Y in accordance with the plotted data (step 34).

The electric field intensity of broadcast control channel $f_{2A}$ reported from the mobile stations under the control of base station 2D can also be provided through base station 2D and operation and maintenance center 3B.

Another example of a maintenance data processing is the depiction of a coverage area map for each base station. Since each mobile station reports "data for control base station" to the base station which controls the mobile station, the only thing requiring special attention by operation and maintenance center 3A is which base station "maintenance data" are reported from.

Figure 9:
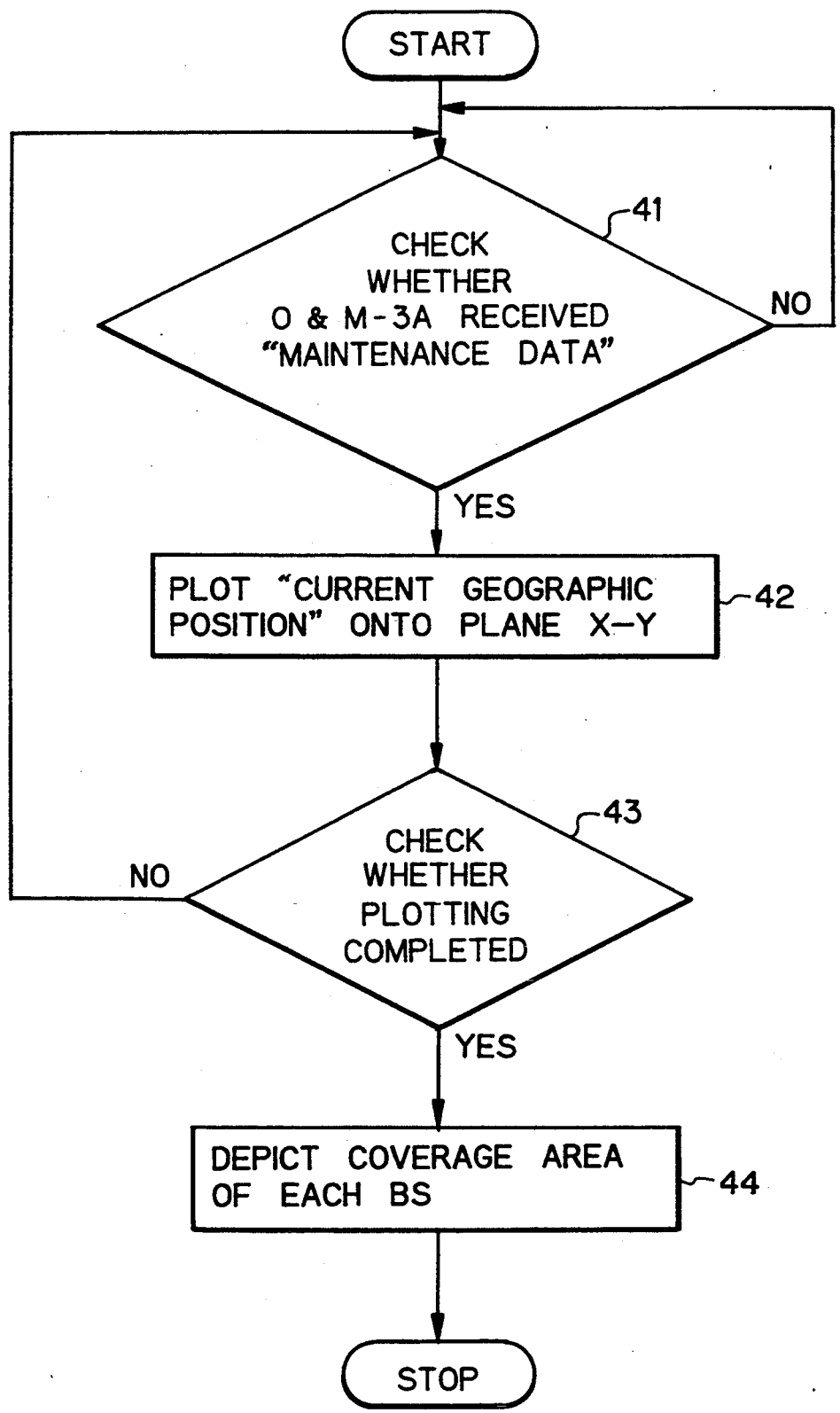
FIG. 9 is a flow chart of the process of depicting the coverage area map of base stations.

An example of the process required for realizing a coverage area map is shown in FIG. 9.

Operation and maintenance center 3A monitors the reception of "maintenance data" from all of base stations 2A, 2B and 2C which are connected to the center (step 41).

Figure 10:
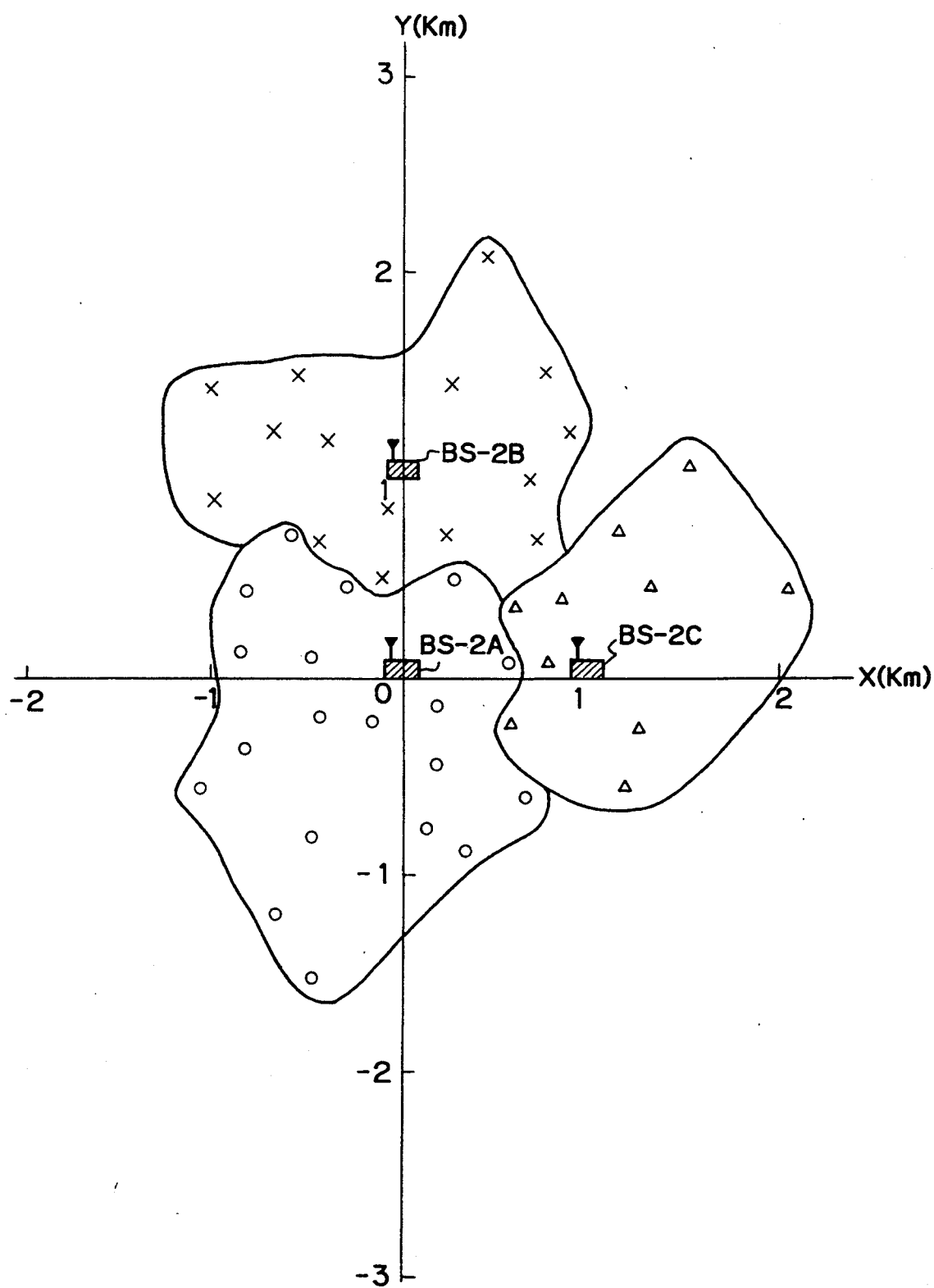
FIG. 10 shows a map plotting the current geographic positions of mobile stations.

Upon being received, "maintenance data" are classified according to the base stations from which the data are sent, "current geographic positions" of the relevant mobile stations are plotted onto plane X-Y. In FIG. 10, the data from base station 2A are designated by ○, the data from base station 2B are designated by X and the data from base station 2C are designated by Δ (step 42).

Processing is terminated either when the number of samples collected has reached a certain arbitrary value x or when a predetermined time has passed (step 43).

Figure 11:
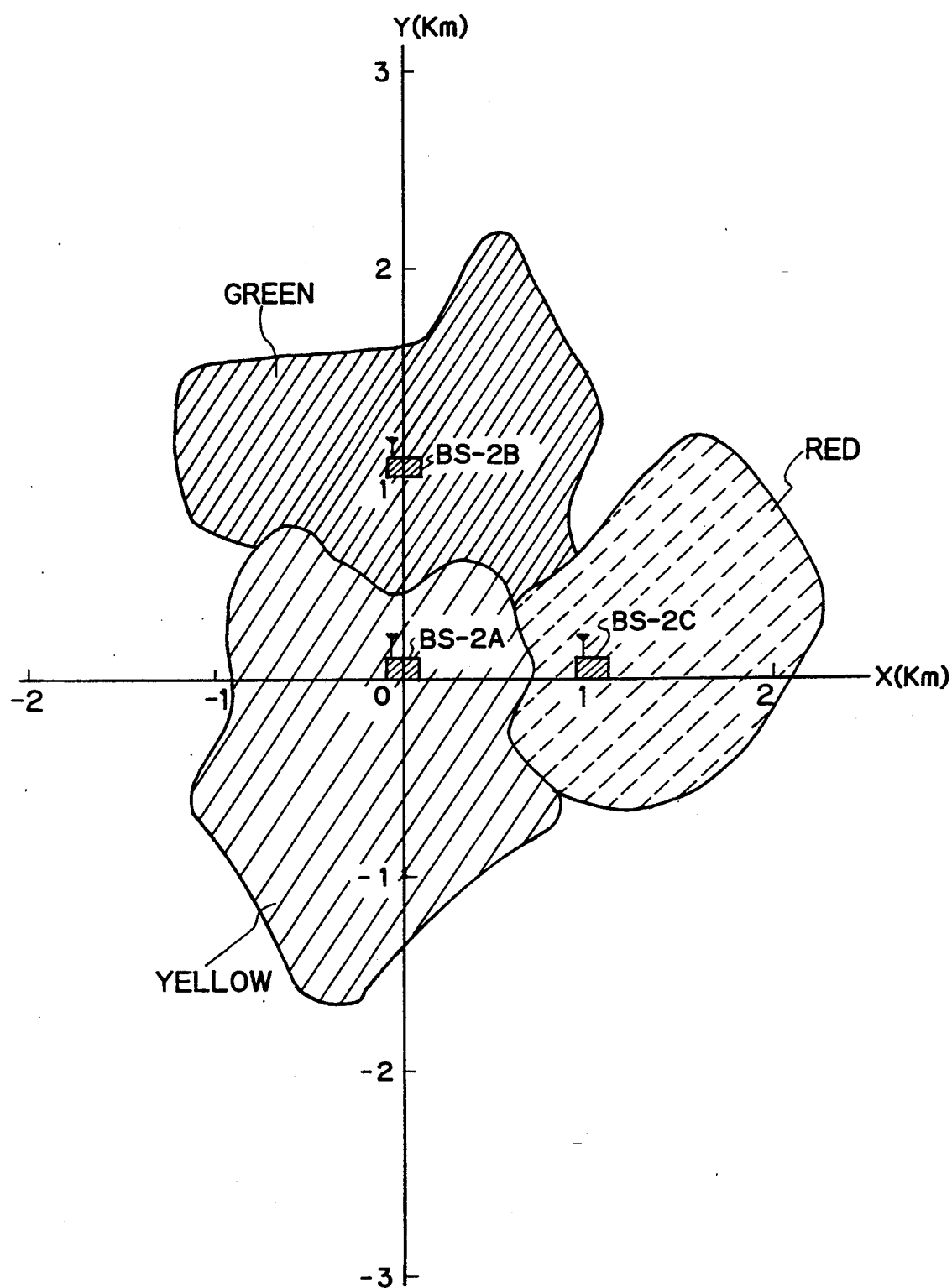
FIG. 11 shows a coverage area map of base stations.

As shown in FIG. 10, border lines are depicted according to the boundaries of different designations. The border lines mean the boundaries of the coverage area for each base station. Furthermore, the displayed picture can be enhanced by utilizing visual effects as exemplified in FIG. 11. As an example, the area containing the spots shown by ○ can be colored yellow, the area containing the spots shown by X can be colored green and the area containing the spots shown by Δ can be colored red. The cover areas of each base station can thus be clearly identified (step 44).

What is claimed is:

1. A method of controlling a digital mobile communications system which maintains synchronization among data of base stations being sent, measures the time delay of radio waves transmitted from mobile stations under control at the control base station, instructs the value of said time delay to each of said mobile stations to adjust the timing of data of said mobile stations being sent to establish synchronization of communications between said base station and said mobile stations, measures at said mobile station relative time delays of radio waves transmitted from at least one base station other than said control base station with respect to the radio waves transmitted from said control base station, periodically reports the information on said relative time delays to said control base station from said mobile station, periodically calculates at said control base station the distances between said mobile station and each of said base stations based on said information on said time delay and relative time delays, and periodically determines at said control base station the current geographic position of said mobile station based on said calculated distances between said mobile station and each of at least three of said base stations by referring to geographic positional data of said base stations, said method comprising the steps of:

periodically measuring at said mobile station the electric field intensity of the radio waves transmitted from each of said base stations including said control base station during the same period as measuring said relative time delays, reporting from said mobile station to said control base station information on said field intensity together with information on said relative time delays, and depicting at an operation and maintenance center an electric field intensity distribution map for radio waves by plotting said electric field intensity of the same radio waves reported through said base stations from a plurality of said mobile stations at said current geographic positions of said mobile stations.

2. The method of controlling a digital mobile communications system according to claim 1, further comprising the step of depicting at said operation and maintenance center a map showing the coverage area of each of said base stations by plotting said current geographic positions of said mobile stations under control by assigning different designations to each base station for plotting.

3. A digital mobile communications system which maintains synchronization among data of base stations being sent, measures the time delay of radio waves transmitted from mobile stations under control at the control base station, instructs the value of said time delay to each of said mobile stations to adjust the timing of data of said mobile stations being sent to establish synchronization of communications between said base station and said mobile stations, measures at said mobile station relative time delays of radio waves transmitted from at least one base station other than said control base station with respect to the radio waves transmitted from said control base station, periodically reports information on said relative time delays to said control base station from said mobile station, periodically calculates at said control base station the distances between said mobile station and each of said base stations based on said information on said time delay and relative time delays, and periodically determines at said control base station the current geographic position of said mobile station based on said calculated distances between said mobile station and each of at least three of said base stations by referring to the geographic position data of said base stations, said system comprising:

means for periodically measuring at said mobile station the electric field intensity of radio waves transmitted from each of said base stations including said control base station during the same period as measuring said relative time delays, means for reporting from said mobile station to said control base station information on said electric field intensity together with information on said relative time delays, and means for depicting at an operation and maintenance center an electric field intensity distribution map for radio waves by plotting said electric field intensity of said radio waves reported through said base stations from a plurality of said mobile stations.

4. The digital mobile communications system according to claim 3, further comprising means for depicting a map showing the cover area of each of said base stations by plotting said current geographic positions of said mobile stations under control by assigning different designations to each base station for plotting.

5. A method for providing an electric field intensity distribution map for a digital mobile communications system comprising base stations having fixed geographical coordinate positions, said base stations including a control base station and a plurality of auxiliary base stations, said system further comprising a plurality of mobile stations under the control of said control base station, said method comprising the steps of:

(a) maintaining synchronization among data sent from said base stations;

(b) periodically measuring at said control base station time delays of radio waves transmitted from said mobile stations;

(c) periodically instructing said time delays to said mobile stations to adjust data sent from said mobile stations to establish synchronization of communications between said control base station and said mobile stations;

(d) periodically measuring at said mobile stations relative time delays of radio waves transmitted from said auxiliary base stations with respect to radio waves transmitted from said control base station;

(e) periodically measuring at said mobile stations an electric field intensity of the radio waves transmitted from said base stations;

(f) periodically reporting from said mobile stations said relative time delays and said electric field intensity measurements to said control base station;

(g) periodically calculating at said control base station the distance between said mobile stations and each of said base stations based on said time delay of said mobile stations and said relative time delays measured at said mobile stations;

(h) periodically determining at said control base station current geographical coordinate positions of said mobile stations based on said calculated distances between said mobile stations and each of at least three of said base stations by referring to said geographical coordinate positions of said base stations; and (i) generating said electric field intensity distribution map for each of said base stations using said measurements of electric field intensity reported from said mobile stations and geographical coordinate positions of said mobile stations.

6. A method for providing a coverage area map for a digital mobile communications system comprising base stations having fixed geographical coordinate positions, said base stations including a control base station and a plurality of auxiliary base stations, said system further comprising a plurality of mobile stations under the control of said control base station, said method comprising the steps of:

(a) maintaining synchronization among data sent from said base stations;

(b) periodically measuring at said control base station time delays of radio waves transmitted from said mobile stations;

(c) periodically instructing said time delays to said mobile stations to adjust data sent from said mobile stations to establish synchronization of communications between said control base station and said mobile stations;

(d) periodically measuring at said mobile stations relative time delays of radio waves transmitted from said auxiliary base stations with respect to radio waves transmitted from said control base station;

(e) periodically reporting from said mobile stations said relative time delays to said control base station;

(f) periodically calculating at said control base station the distance between said mobile stations and each of said base stations based on said time delay of said mobile stations and said relative time delays measured at said mobile stations;

(g) periodically determining at said control base station current geographical coordinate positions of said mobile stations based on said calculated distances between said mobile stations and each of at least three of said base stations by referring to said geographical coordinate positions of said base stations;

(h) repeating steps (b) through (g) for a different control base station and a plurality of mobile stations under the control of said different control base station; and (i) depicting said coverage area map by assigning different symbols to each of said control base stations and by plotting said symbols at geographical coordinate positions of said mobile stations under the control of said control base station corresponding to said symbol.

7. A digital mobile communications system for providing an electric field intensity distribution map comprising:

(a) base stations having fixed geographical coordinate positions, said base stations including a control base station and a plurality of auxiliary base stations;

(b) a plurality of mobile stations under the control of said control base station;

(c) means for maintaining synchronization among data sent from said base stations;

(d) means for periodically measuring at said control base station time delays of radio waves transmitted from said mobile stations;

(e) means for periodically instructing said time delays to said mobile stations to adjust data sent from said mobile stations to establish synchronization of communications between said control base station and said mobile stations;

(f) means for periodically measuring at said mobile stations relative time delays of radio waves transmitted from said auxiliary base stations with respect to radio waves transmitted from said control base station;

(g) means for periodically measuring at said mobile stations an electric field intensity of the radio waves transmitted from said base stations;

(h) means for periodically reporting from said mobile stations said relative time delays and said electric field intensity measurements to said control base station;

(i) means for periodically calculating at said control base station the distance between said mobile stations and each of said base stations based on said time delay of said mobile stations and said relative time delays measured at said mobile stations;

(j) means for periodically determining at said control base station current geographical coordinate positions of said mobile stations based on said calculated distances between said mobile stations and each of at least three of said base stations by referring to said geographical coordinate positions of said base stations; and (k) means for generating said electric field intensity distribution map for each of said base stations using said measurements of electric field intensity reported from said mobile stations and geographical coordinate positions of said mobile stations.

8. A digital mobile communications system for providing a coverage area map comprising:

(a) base stations having fixed geographical coordinate positions;

(b) means for maintaining synchronization among data sent from said base stations;

(c) a first control base station and a plurality of first auxiliary base stations included in said base stations;

(d) a plurality of mobile stations under the control of said first control base station;

(e) means for periodically measuring at said first control base station time delays of radio waves transmitted from said mobile stations;

(f) means for periodically instructing said time delays to said mobile stations to adjust data sent from said mobile stations to establish synchronization of communications between said first control base station and said mobile stations;

(g) means for periodically measuring at said mobile stations relative time delays of radio waves transmitted from said first auxiliary base stations with respect to radio waves transmitted from said first control base station;

(h) means for periodically reporting from said mobile stations said relative time delays to said first control base station;

(i) means for periodically calculating at said first control base station the distance between said mobile stations and each of said base stations based on said time delay of said mobile stations and said relative time delays measured at said mobile stations;

(j) means for periodically determining at said first control base station current geographical coordinate positions of said mobile stations based on said calculated distances between said mobile stations and each of at least three of said base stations by referring to said geographical coordinate positions of said base stations;

(k) a second control base station and a plurality of second auxiliary base stations included in said base stations;

(l) a plurality of mobile stations under the control of said second control base station;

(m) means for periodically measuring at said second control base station time delays of radio waves transmitted from said mobile stations;

(n) means for periodically instructing said time delays to said mobile stations to adjust data sent from said mobile stations to establish synchronization of communications between said second control base station and said mobile stations;

(o) means for periodically measuring at said mobile stations relative time delays of radio waves transmitted from said second auxiliary base stations with respect to radio waves transmitted from said second control base station;

(p) means for periodically reporting from said mobile stations said relative time delays to said second control base station;

(q) means for periodically calculating at said second control base station the distance between said mobile stations and each of said base stations based on said time delay of said mobile stations and said relative time delays measured at said mobile stations;

(r) means for periodically determining at said second control base station current geographical coordinate positions of said mobile stations based on said calculated distances between said mobile stations and each of at least three of said base stations by referring to said geographical coordinate positions of said base stations; and (s) means for depicting said coverage area map by assigning different symbols to each of said control base stations and by plotting said symbols at geographical coordinate positions of said mobile stations under the control of said control base station corresponding to said symbol.

* * * * *